United States Patent
Yang

[19]

[11] Patent Number: 6,135,718
[45] Date of Patent: Oct. 24, 2000

[54] INTERFACE APPARATUS FOR FAN MONITORING AND CONTROL

[75] Inventor: Ta-yung Yang, Tao Yuan, Taiwan

[73] Assignee: System General Corporation, Milpitas, Calif.

[21] Appl. No.: 09/276,462

[22] Filed: Mar. 25, 1999

[51] Int. Cl.[7] ............................... G05B 5/00; F04B 49/00
[52] U.S. Cl. .......................... 417/22; 417/32; 417/44.1; 318/471; 318/472; 318/599; 388/611; 388/811
[58] Field of Search .............................. 417/22, 44.1, 32; 388/611, 811; 318/471, 472, 599, 461, 811, 798, 473, 439

[56] References Cited

U.S. PATENT DOCUMENTS

| | | |
|---|---|---|
| 4,337,497 | 6/1982 | Dalle Carbonare . |
| 4,479,115 | 10/1984 | Holzhauer . |
| 4,513,233 | 4/1985 | Giammarrusco . |
| 4,659,290 | 4/1987 | Kundert . |
| 4,722,669 | 2/1988 | Kundert . |
| 4,756,473 | 7/1988 | Takamae et al. . |
| 5,070,267 | 12/1991 | Sano et al. . |
| 5,125,571 | 6/1992 | Heber . |
| 5,285,650 | 2/1994 | Lin . |
| 5,436,827 | 7/1995 | Gunn et al. . |
| 5,448,143 | 9/1995 | Pecone . |
| 5,534,854 | 7/1996 | Bradbury et al. . |
| 5,825,972 | 10/1998 | Brown . |
| 5,942,866 | 8/1999 | Hsieh ........................ 318/268 |
| 5,952,798 | 9/1999 | Jones et al. ............... 318/268 |
| 6,008,603 | 12/1999 | Jones et al. ............... 318/254 |
| 6,023,139 | 2/2000 | Chin ......................... 318/434 |
| 6,040,668 | 3/2000 | Huynh et al. ............. 318/471 |

*Primary Examiner*—Teresa Walberg
*Assistant Examiner*—Jeffrey Pwu

[57] ABSTRACT

An interface apparatus for fan monitoring and control includes a current source amplifier that generates a programmable current in response to its input voltages. Associated with an output capacitor, which is able to reduce noise, the programmable current drives the fan at a desired speed. The rotating fan induces a ripple signal in the output capacitor, which is fed to a band-pass amplifier to produce a tachometer pulse. Through a buffer amplifier, an input control signal combined with a thermal sensor signal has direct control over the current source amplifier. Alternatively, a PWM circuit having a comparator, a ramp oscillator and the output of the buffer amplifier drives the current source amplifier in switching mode. Since the ramp oscillator can be synchronized by the input, both analog and pulse signals can function as the input control signals.

6 Claims, 6 Drawing Sheets

INTERFACE APPARATUS FOR FAN MONITORING AND CONTROL

BACKGROUND OF THE INVENTION

1. Field of Invention

The present invention relates to an interface circuit which is used for fan speed monitoring and control, and more specifically to DC (direct current) fan speed monitoring and control.

2. Description of Related Art

Fan cooling is typically used to cool equipment, such as a computer or projector, when the power concentration of the equipment exceeds its natural cooling capability, and exhibits the significant advantage of superior heat dissipation as compared to natural cooling. Specifically, fan cooling has several times the heat removal capacity of natural cooling, and is less affected by the temperature of adjacent parts. A major disadvantage of fan cooling, however, is the contamination of internal parts by, for example, dust, oil fumes, and cigarette smoke carried into the equipment by the air stream. Although air filters can be used to reduce the effects of such contamination, failure to regularly clean the filter can result in slower fan speed, which consequently reduces the effectiveness of the fan cooling. The resulting higher working temperature of the equipment generally increases the failure rate of the system since a high Mean Time Between Failure (MTBF) requires low working temperatures. Furthermore, fan failure can result in overheating, and may cause permanent damage to the system.

Equipping a fan monitor to detect slow fan speed or fan failure provides information to warn the user of a dirty air-filter, or automatically locks the system into a low power mode when the fan fails. Such fan control conserves energy, which is advantageous to computer and other equipment manufacturers who have been striving to meet energy conservation requirements.

Many fan controllers and monitors have been proposed. Such fan monitors generally use either (1) a sensor positioned adjacent to the fan to sense the fan rotation; (2) a special fan with a tachometer output, which is generated by a Hall-effect switch; or (3) a current sensing resistor that senses the fan motor current and produces a tachometer pulse. These proposed fan controllers usually control fan speed by adjusting the fan voltage, in which the PWM (pulse width modulation) or the pulsed mode control prevents fan locking (freezing) at low speed or during the fan start-up period. In general, the input of the fan controller is an analog signal, which may be OR'ed with a thermal sensor signal for the fan speed control.

The following drawbacks, however, result from such prior art designs.

(1) It is inconvenient and expensive to install a rotation sensor or use a special fan instead of a standard fan.

(2) When the fan rotates at high speed or low speed, the current flow through the fan is quite different. Consequently, it is difficult to design an adequate amplifier to amplify the signal that is sensed from the current sensing resistor.

(3) The switching mode (PWM or pulse mode) fan control is too noisy for the amplifier to sense an accurate current and generate a correct tachometer pulse. Furthermore, the switching mode control produces not only an EMI (Electro-Magnetic Interference) problem, but also introduces a low frequency fan turning noise into the system through the coupled power supply.

(4) Many microprocessors or micro-controllers include built-in counters for pulse counting, but most of the proposed fan monitors output a pass/fail signal only. The data acquired from these fan monitors is insufficient to analyze the characteristics of the fan.

(5) In order to OR an input fan control signal with a thermal sensor signal, the input control signal of these proposed fan controllers is generally an analog signal. However, it is not economical to install a D/A converter specifically for the fan speed control. Moreover, for some low cost micro-controllers, it is easy to output a low frequency PWM signal (30~50 Hz) for the fan speed control. If the input of the fan speed controller can accept both analog and digital pulse (PWM) signals, this will help reduce the cost of the control circuit.

The disadvantages listed above reveal that prior art designs fail to meet significant needs of fan monitoring and control.

SUMMARY OF THE INVENTION

An object of the present invention is to provide solutions to the disadvantages listed above, and to offer a simple, flexible, and reliable low cost interface apparatus for fan speed monitoring and control.

In accordance with the present invention, an interface apparatus includes a current source amplifier to generate a programmable current in response to its input voltages. Associated with an output capacitor, which reduces noise, the programmable current controls the fan to a desired speed. A ripple signal in the output capacitor, which is induced by the fan rotation, is fed as an AC signal to a band-pass amplifier. After amplification the resultant signal is converted to a logical and open-collect tachometer pulse. The output of the tachometer is proportional to the fan speed and results in, for example, two pulses per revolution. Via a buffer amplifier, a combined thermal sensor signal and input control signal are simply connected to the current source amplifier for the fan speed control. A high input control signal or a low thermal sensor signal makes the fan turn rapidly. For an effective PWM control, the output of the buffer amplifier is connected to the input of a comparator, and another input of the comparator is linked with a ramp oscillator to construct a PWM circuit. When the input control signal is a pulse signal instead of an analog signal, the ramp oscillator can be synchronized with the input control signal. The output of the comparator can be connected to the current source amplifier for the PWM control.

Since the PWM control can be synchronized with the input pulse signal, both analog and digital pulse signals can control the fan speed. Regardless of the analog or digital pulse signal, the thermal sensor signal is able to override the input control signal as long as the thermal sensor signal is low (sensed temperature is high).

Due to the fact that noise is hard to filter in the voltage source, a technical advantage achieved by the present invention is a high output impedance of the current source. The current source amplifier incorporated with the output capacitor dramatically reduces noises from the fan turning and the PWM switching.

Another technical advantage achieved is that the fan speed is sensed from the ripple signal in the output capacitor. This ripple signal is noiseless. Furthermore, the change of the fan voltage has only a minor influence on the ripple voltage amplitude. Therefore, the ripple signal can be easily and accurately amplified. Through the monitoring and control of the fan, the present invention reduces power consumption and decreases acoustic noise.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood by the accompanying drawings which are given by way of illustration only, and thus are not limitative of the present invention, and wherein.

DETAILED DESCRIPTION OF PREFERRED EMBODIMENT

Figure 1:
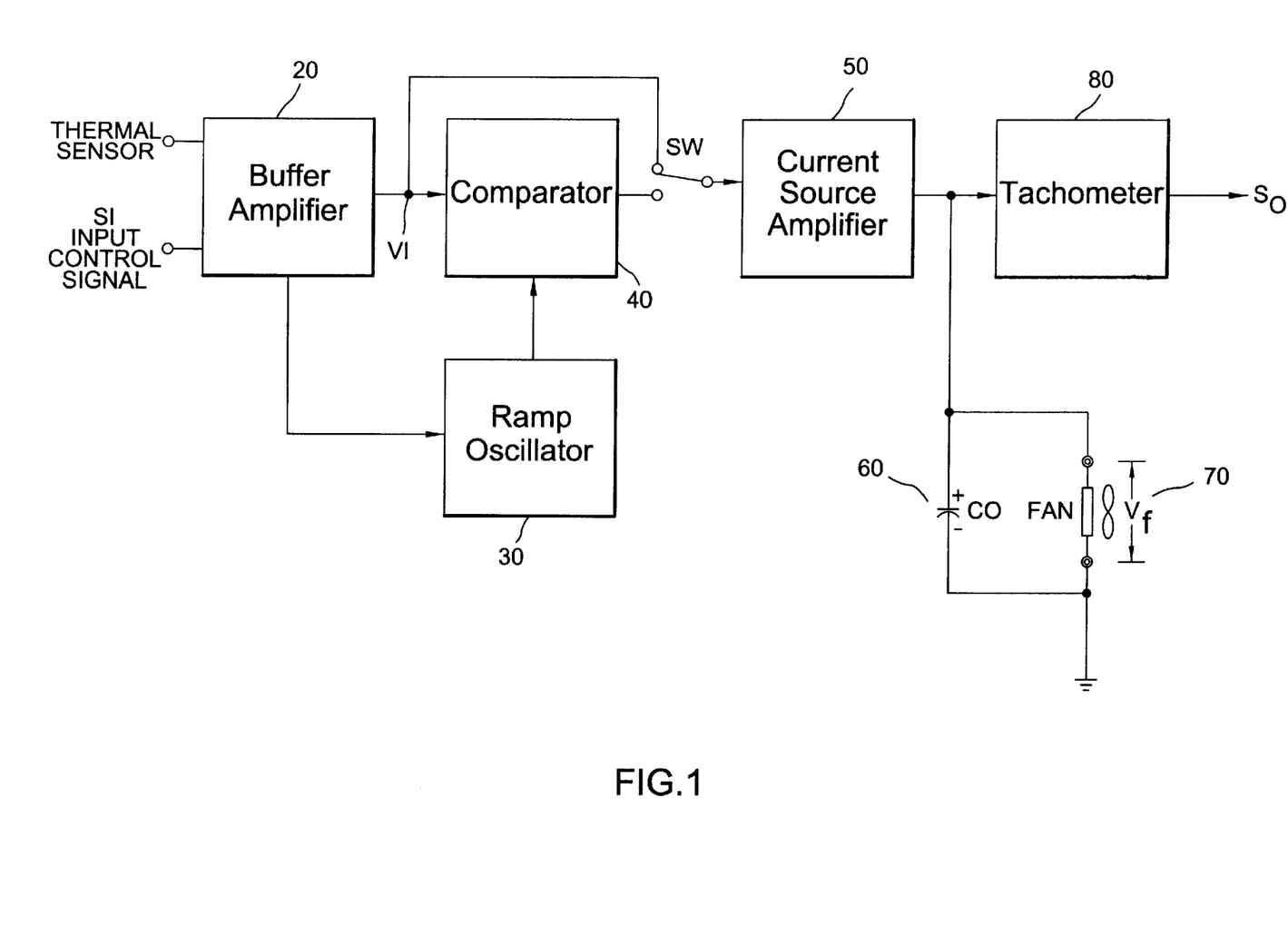
FIG. 1 is a block diagram of the interface apparatus for fan monitoring and control, according to the present invention.

FIG. 1 is a block diagram of an interface apparatus according to an embodiment of the present invention. The interface apparatus includes a buffer amplifier 20, a current source amplifier 50, an output capacitor 60, an electronic tachometer 80, a comparator 40, a switch SW, and a ramp oscillator 30. The buffer amplifier 20 allows two inputs: an input control signal SI and a thermal sensor signal. The thermal sensor can be a minus temperature coefficient device such as a thermistor or a diode which generates a thermal sensor signal which varies as a function of the sensing element temperature.

The buffer amplifier 20 outputs a high level signal when the input control signal SI is high and/or the thermal sensor signal is low. The output signal VI of the buffer amplifier 20 can be directly applied to the current source amplifier 50 for the fan speed control through a first path of the switch SW. However, for effective PWM control, the output signal VI of the buffer amplifier 20 is connected to the input of the comparator 40. Another input of the comparator 40 is connected to the low frequency ramp oscillator 30. The ramp oscillator 30 can be synchronized with the input control signal SI. The output signal of the comparator 40 is a PWM signal, which is also linked to the input of the current source amplifier 50 through a second path of the switch SW for the PWM fan control.

In response to the input voltage, the current source amplifier 50 outputs a programmable current. Incorporated with the output capacitor 60, which is able to reduce noise, the programmable current output by the current source amplifier 50 controls the fan 70 at a desired speed. When the fan 70 is turning, the fan motor current induces a ripple current signal in the output capacitor 60. The ripple current signal from the capacitor 60 is fed as an AC signal to the electronic tachometer 80. As discussed below in more detail, the electronic tachometer 80 has a band-pass amplifier that amplifies and converts the ripple signal to a tachometer pulse SO (a logical pulse signal). The open-collect output of the electronic tachometer 80 outputs two pulses per fan revolution.

Figure 2:
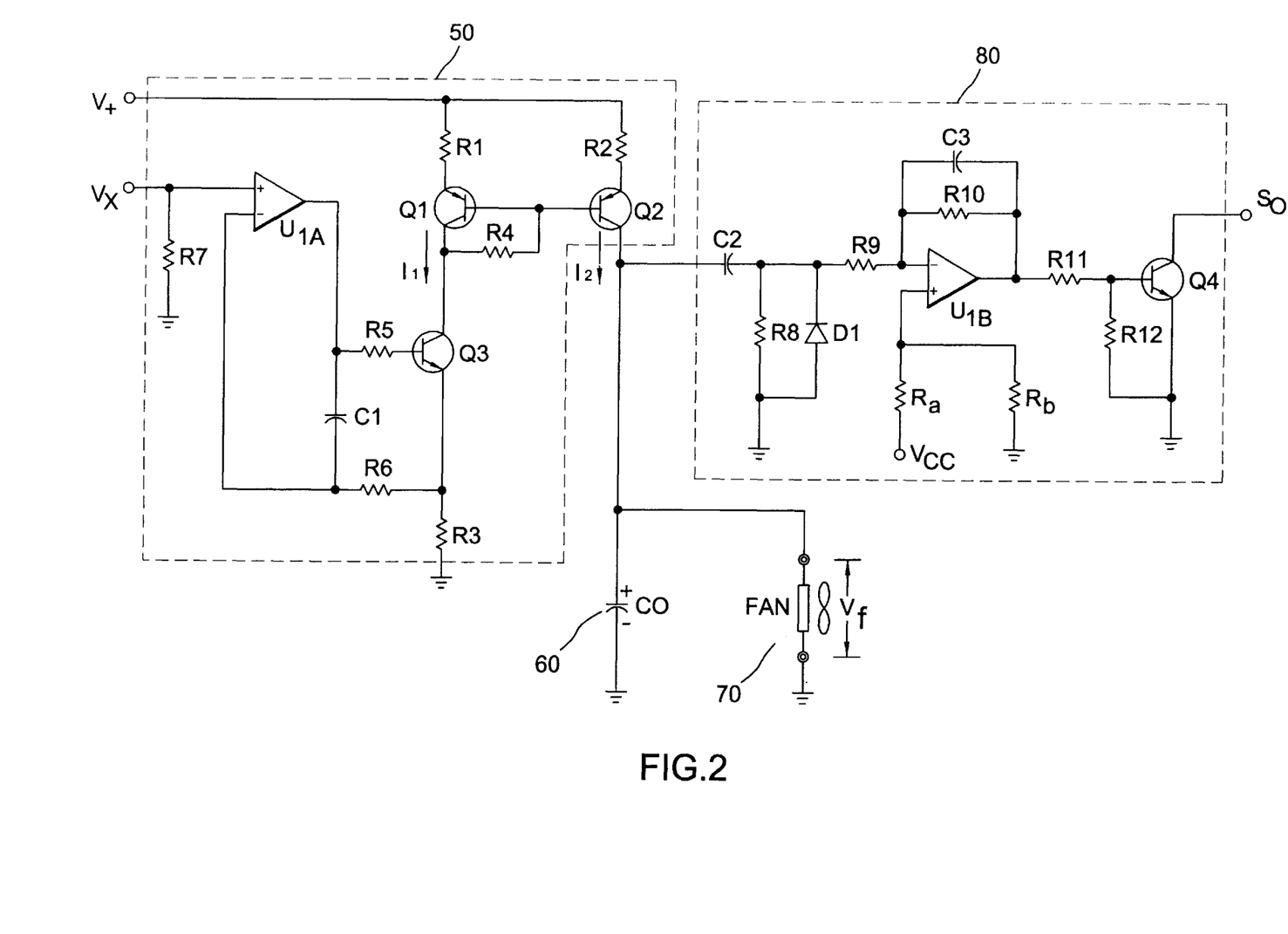
FIG. 2 is a detailed schematic of the current source amplifier for the fan speed control and the electronic tachometer for the fan speed monitoring, according to the present invention.

FIG. 2 is a detailed schematic of the current source amplifier 50 and the electronic tachometer 80, according to an embodiment of the present invention. The input of the current source amplifier 50 includes a grounded resistor R7 and is connected to the positive input of an op amp (operational amplifier) U1A. Via a resistor R5, the output of the op amp U1A drives the base of a npn transistor Q3. The emitter of the transistor Q3 is connected to a grounded resistor R3. A resistor R6 is connected from the emitter of the transistor Q3 to the negative input of the op amp U1A for the feedback. A capacitor C1 is connected between the output and the negative input of the op amp U1A to form low pass amplification. The collector of the transistor Q3 is connected to the collector of a pnp transistor Q1. Connected between the emitter of the transistor Q1 and a positive voltage source V+ is a resistor R1. A resistor R4 is connected between the collector and the base of the transistor Q1. The base of the transistor Q1 and the base of a pnp transistor Q2 are connected together. Connected between the emitter of the transistor Q2 and the positive voltage source V+ is a resistor R2. The collector of the transistor Q2 is the output of the current source amplifier 50. The output capacitor 60 is connected between the output of the current source amplifier 50 and ground. The fan 70 is connected in parallel with the output capacitor 60.

The electronic tachometer 80 includes an op amp U1B. The negative input of the op amp U1B has a resistor R9 in series with a capacitor C2 connected to the output of the current source amplifier 50. The junction of the resistor R9 and the capacitor C2 has a resistor R8 in parallel with a diode D1 connected to ground. The anode of the diode D1 is grounded. A voltage divider network consisting of resistors Ra and Rb is connected to the positive input of the op amp U1B, and is connected between a positive voltage source Vcc and ground, which results in a low reference voltage at the positive input of the op amp U1B. A resistor R10 in parallel with a capacitor C3 is connected between the output and the negative input of the op amp U1B. Through a resistor R11, the output of the op amp U1B drives the base of a npn transistor Q4. A resistor R12 is connected between the base and the emitter of the transistor Q4. The emitter of the transistor Q4 is grounded. The collector of the transistor Q4 is the open-collect output of the electronic tachometer 80.

Figure 3:
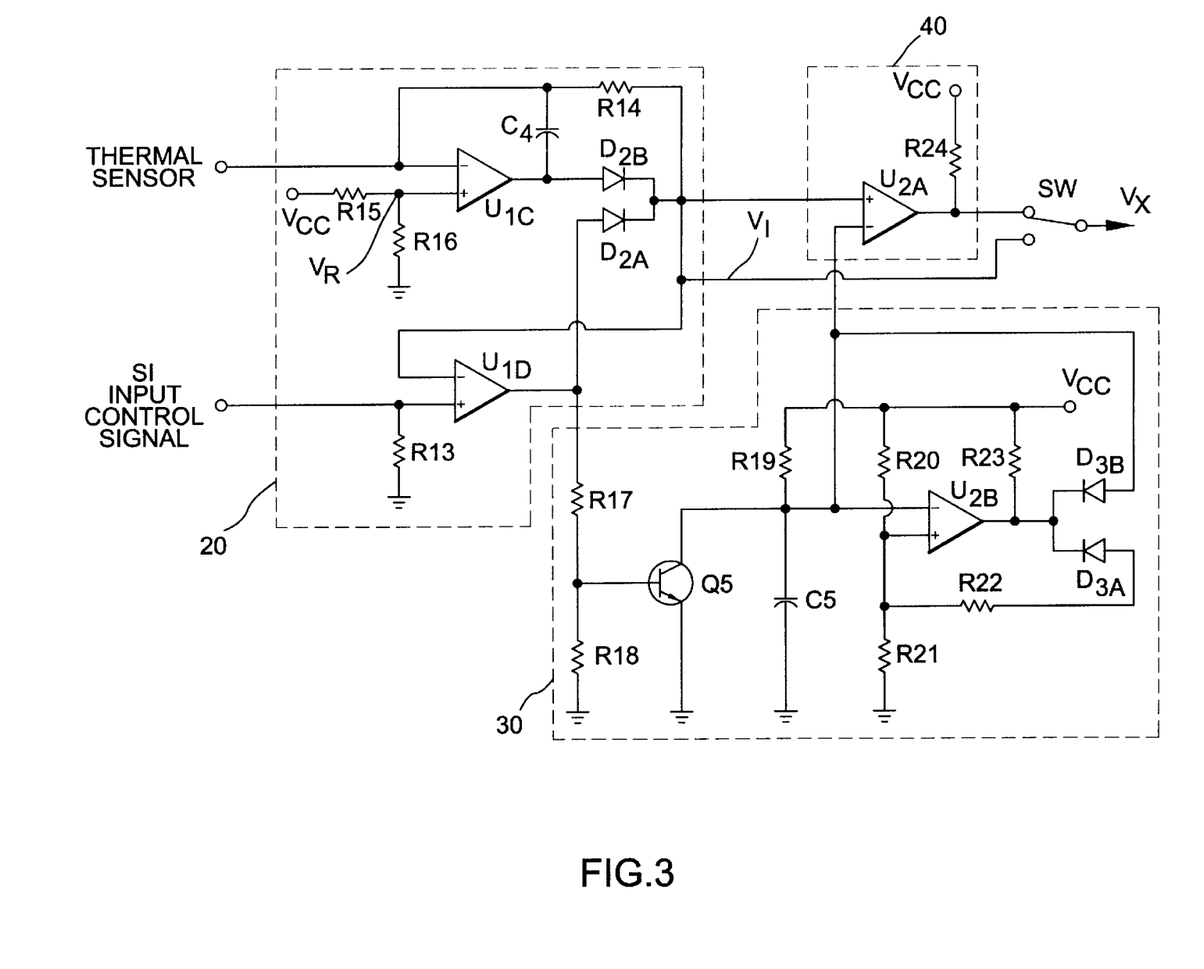
FIG. 3 is a detailed schematic of the input buffer amplifier and the PWM control circuit, according to the present invention.

FIG. 3 is a detailed schematic of the buffer amplifier 20, the comparator 40 and the ramp oscillator 30, according to the present invention. The buffer amplifier 20 includes an op amp U1D and an op amp U1C. The input control signal SI is connected to the positive input of the op amp U1D. A resistor R13 is connected from the positive input of the op amp U1D to ground. Through the connection of a diode D2A, the output of the op amp U1D is coupled to the output of the buffer amplifier 20 and the negative input of the op amp U1D. The thermal sensor signal is connected to the negative input of the op amp U1C. Connected between the output and the negative input of the op amp U1C is a capacitor C4. Through the connection of a diode D2B, the output of op amp U1C is coupled to the output of the buffer amplifier 20. A resistor R14 is connected between the output of the buffer amplifier 20 and the negative input of the op amp U1C. The cathodes of the diode D2A and D2B are connected together, and this connection is the output of the buffer amplifier 20. The output of the buffer amplifier 20 is connected to the positive input of a comparator U2A (of the comparator 40). A voltage divider network consisting of resistors R15 and R16 is connected between the positive voltage source Vcc and ground, which results in a reference voltage VR at the positive input of the op amp U1C.

The ramp oscillator 30 includes a comparator U2B. The negative input of the comparator U2B has a grounded capacitor C5 and a resistor R19. The resistor R19 is connected to the positive voltage source Vcc. A voltage divider network consisting of resistors R17 and R18 is connected between the output of op amp U1D and ground. The junction of the resistors R17 and R18 is connected to the base of a npn transistor Q5. The emitter of the transistor Q5 is grounded. The collector of the transistor Q5 is connected to the negative input of the comparator U2B. The positive input of the comparator U2B has a grounded resistor R21 and a resistor R20. The resistor R20 is connected to the positive voltage source Vcc. A resistor R22 in series with a diode D3A is connected between the output and the positive input of the comparator U2B. Connected between the output and the negative input of the comparator U2B is a diode D3B. The cathodes of the diodes D3A and D3B are connected to the output of the comparator U2B. The output of the comparator U2B has a resistor R23 connected to the positive voltage source Vcc. The junction of the resistor R19 and the capacitor C5 is the output of the ramp oscillator 30 and is connected to the negative input of the comparator U2A (of the comparator 40).

In the comparator 40, a resistor R24 is connected between the output of the comparator U2A and the positive voltage source Vcc. The output of the comparator U2A is the output of the comparator 40.

Operation

The operation of FIG. 2 in accordance with the present invention is as follows: The transistors Q1 and Q2 construct a current mirror amplifier. When the difference of the Vbe (the base-emitter voltage) of the transistors Q1 and Q2 is small and the gain (hfe) of the transistors Q1 and Q2 is high, then I1*R1=I2*R2, where I1 and I2 are the collector current of the transistor Q1 and the collector current of the transistor Q2 respectively. Since the collector of the transistor Q1 and the collector of the transistor Q3 are connected together and the gain of the transistor Q3 is high, the emitter current of the transistor Q3 is equal to I1. The op amp U1A and the transistor Q3 form a V-I converter (voltage to current converter). Therefore Vx=I1*R3, where Vx is the input signal of the current source amplifier 50.

This can be expressed as $$I2 = [R1/(R2*R3)]*Vx \quad (1)$$

The resistor R4 provides a bias for the transistor Q1. The resistors R5, R6 and capacitor C1 stabilize the phase/gain of the V-I converter. The op amp U1B builds the band-pass amplifier and the transistor Q4 outputs the tachometer pulse SO. The voltage divider of the resistors Ra and Rb ensures that the output of the op amp U1B is at a high level in static state. Another voltage divider of the resistors R11 and R12 provides a bias for the transistor Q4. The resistors R10, R9, and R8 provide a DC gain for the band-pass amplifier, which is equivalent to R10/(R9+R8). The band-pass amplifier includes an AC gain of R10/R9, a dominant pole at the frequency of $1/(2\pi*R10*C3)$, and a dominant zero at the frequency of $1/(2\pi*Rp*C2)$; where the resistor Rp=[R8*(R9+R10)/(R8+R9+R10)]. The diode D1 prevents the input of the op amp U1B from being a minus voltage.

Figure 4A:
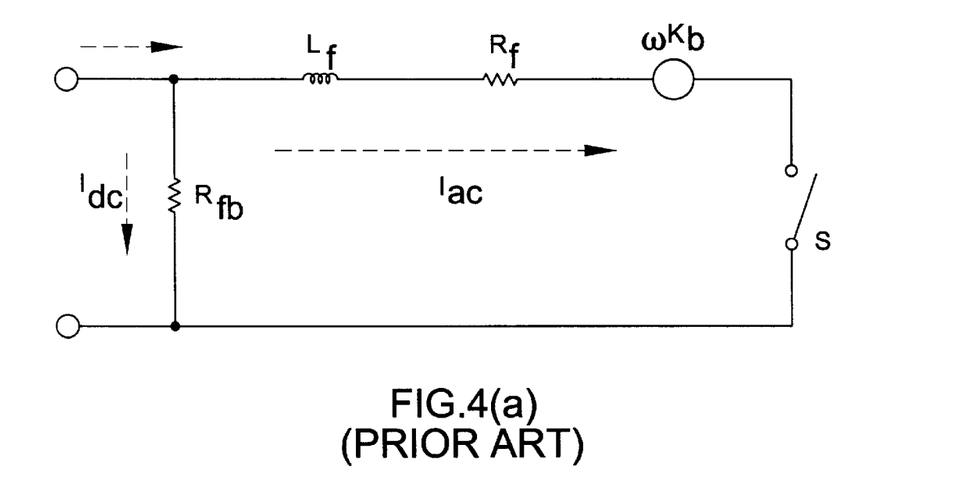
FIGS. 4(a) and 4(b) illustrate an equivalent circuit and the current waveform of the fan, respectively.
Figure 4B:
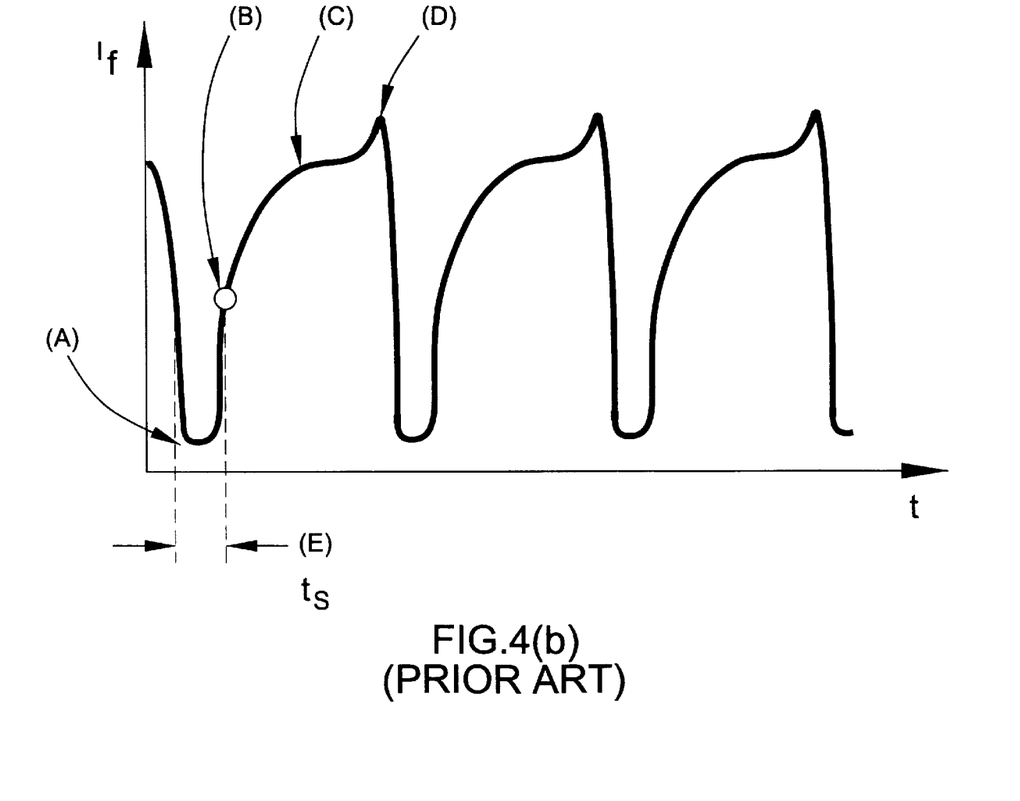
Figure 5:
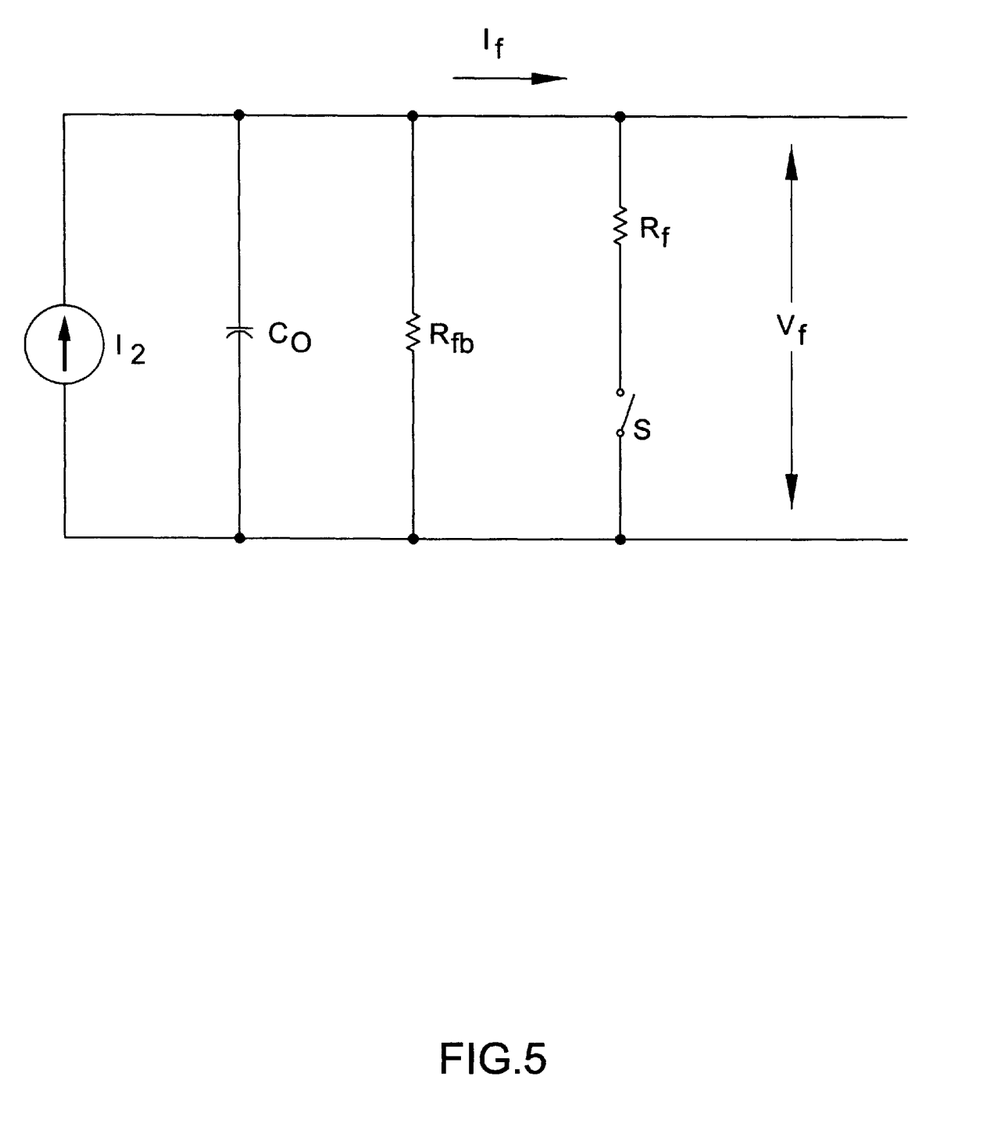
FIG. 5 illustrates an equivalent circuit of the driving circuit and the fan, according to the present invention.

FIGS. 4(a) and 4(b) show an equivalent circuit configuration and the current waveform of the fan respectively. The fan includes a static current (Idc) and a dynamic current (Iac). The static current is the basic power consumption of the fan, and is determined by the fan motor and its rotation circuit design. The static current is expressed as the resistor Rfb in the equivalent circuit and is shown at the point (A) of the waveform in FIG. 4(b). When the fan is turning, a switch S and a resistor Rf in the equivalent circuit represent the phenomenon of the on/off switching. The point (E) of the waveform shows the off state of the fan. The resistor Rf represents the consumed current of the fan during the on state, and is shown at point (C) of the waveform. The inductor Lf represents the inductance of the fan motor. The inductor Lf smooths the fan current and is shown at the point (B) of the waveform. The ωKb is the Back EMF of the fan motor. The ωKb is induced at the moment of turning the fan motor from on to off, and is shown at the point (D) of the waveform. Regardless of Lf and ωKb, FIG. 5 shows an equivalent circuit for the fan 70 and its driving circuit. The current I2 represents the output current of the current source amplifier 50. The capacitor Co represents the output capacitor 60. The fan voltage Vf can be expressed as $$Vf=[Rq/(1+s*Rq*Co)]*I2 \quad (2)$$

where $s=j2\pi f$, $Rq=Rf*Rfb/(Rf+Rfb)$. Since the resistor Rfb is greater than the resistor Rf, (Rfb>>Rf), during the off state, the deviation of the fan voltage Vf can be expressed as $$\Delta Vf(off)=I2*\Delta ts/Co \quad (3)$$

where ts is the off time of the fan when the fan is rotating. Its waveform is shown at the point (E) of FIG. 4(b).

Referring to equation (2), when the current I2 is increased, the fan voltage Vf increases accordingly, and the fan will turn faster. However, a faster turning fan will result in a shorter ts. The magnitude of ts is inversely proportional to the change of the current I2. Thus the variation of the ΔVf (off), in equation (3), will remain within a specific range. The ΔVf (off) can be treated as the ripple voltage in the output capacitor 60. The characteristic of the ΔVf (off) is helpful for the post amplification.

In FIG. 3, the output signal VI of the buffer amplifier 20 will be the higher signal of the input control signal SI and the amplified thermal sensor signal. The op amp U1C includes a pole at the frequency of $1/(2\pi*R14*C4)$. If a thermistor is applied to the thermal sensor input, then the output of the op amp U1C (V1) can be expressed as $$V1=[1+(R14/Rt)]*VR \quad (4)$$

where Rt is the resistance of the thermistor; VR=Vcc*R16/(R15+R16).

The comparator U2B and diodes D3A, D3B construct a ramp oscillator 30 for generating the ramp signal. A time constant and a threshold voltage (Vh) determine the frequency of the ramp oscillator 30. The resistor R19 and the capacitor C5 determine the time constant. The resistors of R20, R21, and R22 set the threshold voltage (Vh) at the positive input of the comparator U2B. The ramp signal that is generated from the capacitor C5 by comparison with the output signal of the buffer amplifier 20 produces a PWM control signal at the output of the comparator U2A. The resistors R23 and R24 provide the pull-high for the open collect output of the comparator U2B and U2A respectively. Via the resistors R17, R18 and the transistor Q5, the input control signal SI is able to reset the capacitor C5. The ramp oscillator 30 can be synchronized by the pulsed input control signal SI if the following criteria are satisfied: (1) the amplitude of the input control signal SI is higher than the voltage of (R17+R18)/R18*Vb, where Vb is the base-emitter voltage of the Q5, Vb≈0.6V; and (2) the switching frequency of the pulsed input control signal SI is higher than the frequency of the ramp oscillator 30.

Figure 6:
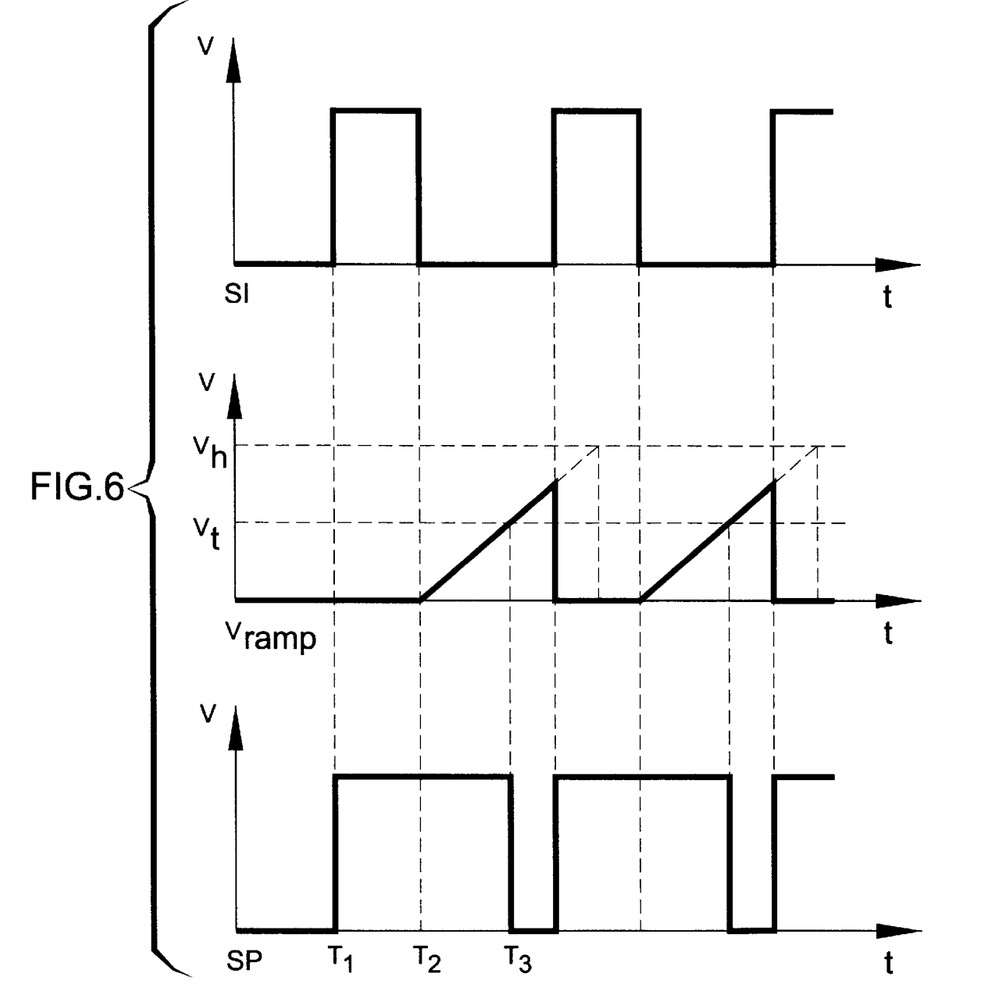
FIG. 6 illustrates a PWM signal waveform, of which the analog type of thermal sensor signal overrides the pulse type of the input control signal, according to the present invention.

FIG. 6 shows the PWM signal waveform at the output of the comparator 40, of which the analog type of thermal sensor signal overrides the pulsed input control signal SI. The pulse width of the input control signal SI is (T2–T1). Vh expresses the threshold voltage at the positive input of the comparator U2B. Vh will determine the signal width of the ramp signal (Vramp). As shown, the off time of the input control signal SI is shorter than the signal width of the ramp signal. The thermal sensor signal generates a signal Vt at the output of the buffer amplifier 20. This results in a PWM signal (SP) that includes a (T3–T1) pulse width at the output of the comparator 40.

Referring again to the FIG. 2, the collector of the transistor Q2 is the output of the current source. Its high output impedance prevents noise from coupling to the power supply. Due to this current source, the output capacitor 60 can be connected in parallel to the fan 70, which significantly reduces noise from the fan turning and the PWM switching. The lack of a built-in current source or current limiter will not allow the output capacitor to be connected to the fan. Consider a scenario of switching transistor sources or sinks an unlimited current to or from the output capacitor during the PWM switching or the on/off control. This unlimited current may easily blow the switching transistor.

Furthermore, the signals and the parameters of the present invention can be adjusted to meet the requirements of various applications. For example, (1) The transistor Q2 can be driven to saturation to reduce the power consumption by adjusting the resistor R3. The current source will limit the output current when the output capacitor 60 is charging or the output is overloading.

(2) The input of the thermal sensor can be a thermistor or a diode, by adjusting the resistor R16. When the diode is used as the thermal sensor, a resistor Rd must be connected in series with the diode for offering a gain. The output of the op amp U1C (VI) can be stated as $$V1=[1+(R14/Rd)]*VR-(R14/Rd)*Vd \quad (5)$$

where Vd is the junction voltage of the diode under the forward bias.

(3) Setting the input control signal SI to zero and counting the tachometer pulse SO periodically allows the user to monitor the temperature of the sensing element. The output pulses of the tachometer 80 are directly proportional to the temperature of the sensing element.

(4) Using the PWM signal instead of the analog signal as the input control signal SI can set the temperature in a specific magnitude for the sensing element. This is due to the fact that the PWM output of the comparator 40 is the sum of the pulsed input control signal SI and the thermal sensor signal.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An interface apparatus for fan monitoring and control comprising:

a buffer amplifier responsive to a thermal sensor signal and an input control signal, for generating a buffer signal;

a ramp oscillator for generating a ramp signal, said ramp signal being synchronized in response to a first logic level of said input control signal;

a comparator, responsive to said buffer signal and said ramp signal for generating a pulse width modulation (pwm) signal;

a current source amplifier, which generates a programmable current, the input of said current source amplifier being either responsive to said buffer signal, or responsive to said pwm signal;

an output capacitor associated with said programmable current to drive a fan at a specific speed, said output capacitor being in parallel with the fan and connected between the output of said current source amplifier and ground; and an electronic tachometer coupled to the output of said current source amplifier and responsive to a ripple signal for generating a tachometer pulse, said ripple signal being induced by the fan rotation in said output capacitor.

2. The interface apparatus in accordance with claim 1, wherein said buffer amplifier comprises:

a first operational amplifier having a positive input coupled to said input control signal, and a negative input coupled to the output of said buffer amplifier;

a second operational amplifier having a negative input coupled to said thermal sensor signal, a positive input coupled to a first reference voltage, said first reference voltage having a first resistor in series with a second resistor connected between a reference voltage source and ground, and the junction of said first resistor and said second resistor being connected to the positive input of said second operational amplifier;

a first diode connected between the output of said first operational amplifier and the output of said buffer amplifier;

a second diode connected between the output of said second operational amplifier and the output of said buffer amplifier;

a feedback resistor connected between the negative input of said second operational amplifier and the output of said buffer amplifier; and a feedback capacitor connected between the negative input of said second operational amplifier and the output of said second operational amplifier.

3. An interface apparatus in accordance with claim 1 wherein said ramp oscillator comprises:

a osc comparator for generating said ramp signal at a negative input of said osc comparator, a time capacitor connected between the negative input of said osc comparator and ground;

a sync transistor for synchronizing said ramp signal with said first logic level of said input control signal, wherein a collector of said sync transistor is connected to the negative input of said osc comparator, and an emitter of said sync transistor is connected to ground;

a first sync resistor connected between the output of said first operational amplifier and a base of said sync transistor for providing bias to said sync transistor; and a second sync resistor connected between the base of said sync transistor and ground for providing the bias to said sync transistor.

4. An interface apparatus in accordance with claim 1 wherein said current source amplifier comprises:

an operational amplifier for converting voltage to current and amplifying the current, a positive input of said operational amplifier being the input of said current source amplifier;

a sink transistor for current control;

a sink resistor connected between an emitter of said sink transistor and ground;

a first base resistor connected between a base of said sink transistor and an output of said operational amplifier;

a feedback resistor connected between the emitter of said sink transistor and a negative input of said operational amplifier;

a feedback capacitor connected between the output of said operational amplifier and the negative input of said third operational amplifier;

a mirror transistor for the current mirror, wherein a collector of said mirror transistor is connected to a collector of said sink transistor;

a drive transistor for generating said programmable current, a base of said drive transistor being connected to a base of said mirror transistor, and a collector of said drive transistor being the output of said current source amplifier;

a first bias resistor connected between the collector of said mirror transistor and the base of said mirror transistor;

a mirror resistor connected between an emitter of said mirror transistor and a positive voltage source; and a drive resistor connected between the emitter of said drive transistor and said positive voltage source.

5. An interface apparatus in accordance with claim 1 wherein said electronic tachometer comprises:

an operational amplifier having a positive input coupled to a reference voltage, wherein said reference voltage has a first resistor in series with a second resistor connected between said reference voltage source and ground, and the junction of said first resistor and said second resistor being connected to the positive input of said operational amplifier;

an ac capacitor in series with a gain resistor connected between the output of said current source amplifier and the negative input of said operational amplifier, said gain resister being connected between said ac capacitor and the negative input of said operational amplifier;

a dc resistor connected between the junction of said ac capacitor and said gain resistor, and ground;

a diode connected parallel with said dc resistor;

a feedback resistor connected between the negative input of said fourth operational amplifier and an output of said operational amplifier;

a feedback capacitor parallel connected with said feedback resistor;

an output transistor for generating said tachometer pulse, an emitter of said output transistor being connected to ground, and a collector of said output transistor being the output of said electronic tachometer;

a base resistor connected between the output of said operational amplifier and a base of said output transistor; and a bias resistor connected between the base of said output transistor and ground.

6. An interface apparatus in accordance with claim 1 wherein the pulse width of said pwm signal is inversely proportional to changes of said thermal sensor signal and is directly proportional to changes of said input control signal.

* * * * *